United States Patent
Thueringer et al.

(10) Patent No.: US 6,581,844 B2
(45) Date of Patent: Jun. 24, 2003

(54) OUTPUT STAGE FOR A COMMUNICATION CONTACT FOR A DATA CARRIER

(75) Inventors: Peter Thueringer, Graz (AT); Peter Kompan, Graz (AT); Klaus Ully, Graz (AT); Stefan Posch, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 123 days.

(21) Appl. No.: 09/825,275

(22) Filed: Apr. 3, 2001

(65) Prior Publication Data

US 2002/0014536 A1 Feb. 7, 2002

(30) Foreign Application Priority Data

Apr. 4, 2000 (EP) .............................................. 00890108

(51) Int. Cl.[7] .............................................. G06K 19/06
(52) U.S. Cl. ....................... 235/492; 235/449; 235/486; 235/487; 235/492; 235/380
(58) Field of Search ................................. 235/492, 449, 235/486, 487, 375, 380; 327/108, 424

(56) References Cited

U.S. PATENT DOCUMENTS

| 4,916,333 | A | * | 4/1990 | Kowalski | ..................... | 326/101 |
|---|---|---|---|---|---|---|
| 4,932,053 | A | * | 6/1990 | Fruhauf et al. | .............. | 235/379 |
| 5,847,447 | A | * | 12/1998 | Rozin et al. | ................. | 235/451 |
| 5,995,629 | A | * | 11/1999 | Reiner | ........................... | 380/1 |
| 5,998,978 | A | * | 12/1999 | Connell et al. | ............. | 323/273 |
| 6,064,740 | A | * | 5/2000 | Curiger et al. | .............. | 380/264 |
| 6,278,783 | B1 | * | 8/2001 | Kocher et al. | ............. | 380/277 |
| 6,298,135 | B1 | * | 10/2001 | Messerges et al. | ............. | 380/1 |
| 6,308,256 | B1 | * | 10/2001 | Folmsbee | ................... | 712/208 |
| 6,327,661 | B1 | * | 12/2001 | Kocher et al. | ................ | 380/28 |
| 6,419,159 | B1 | * | 7/2002 | Odinak | ........................ | 235/492 |

FOREIGN PATENT DOCUMENTS

WO 9638814 A2 12/1996

OTHER PUBLICATIONS

Pezeshki et al., Method and apparatus for minimizing differential power attacks on processors, Mar. 7, 2002, US patent application Publication, (US 2002/0029346).*

* cited by examiner

Primary Examiner—Michael G. Lee
Assistant Examiner—Kim Nguyen
(74) Attorney, Agent, or Firm—Steven R. Biren

(57) ABSTRACT

An output stage (22; 26; 29) of a data carrier (2; 25; 28), which output stage is connected to a communication contact (9), said data carrier being adapted to provide contactless communication via an antenna stage (13) and contact-bound communication via the communication contact (9), includes a first transistor (T1; T4) having a first control terminal (G1; G4), a first input terminal (S1; D4) and a first output terminal (D1; S4), and a second transistor (T2) having a second control terminal (G2), a second input terminal (D2) and a second output terminal (S2), and a control stage (23; 31) for supplying first control information (SI1) to the first control terminal (G1), in order to drive the first transistor (T1; T4) into its conductive state, and for supplying second control information (SI2) to the second control terminal (G2), in order to drive the second transistor (T2) into its conductive state, in which stage an internal supply voltage (VINT), derived from an antenna signal (HF) by a power supply (15) of the data carrier (2; 25; 28) during contactless communication, can be supplied to the first input terminal (S1) and a reference potential (GND) can be supplied to the second output terminal (S2), and in which the second input terminal (D2) is connected to the communication contact (9) of the data carrier (2; 25; 28). The output stage (22; 26; 29) now includes inhibit means (R; D; 30, 31, T4), which is adapted to prevent an analysis current (IA) having an analysis current strength from being fed from the communication contact (9) into the data carrier (2; 25; 28) via the first transistor (T1; T4), the analysis current (IA) having the analysis current strength being suited for the analysis of the power consumption of the data carrier (2; 25; 28) and for hacking communication data (VKD) processed in the data carrier (2; 25; 28).

12 Claims, 3 Drawing Sheets

OUTPUT STAGE FOR A COMMUNICATION CONTACT FOR A DATA CARRIER

BACKGROUND OF THE INVENTION

1. Field of the Invention

The invention relates to an output stage of a data carrier as defined in the opening part of claim 1 and to a data carrier as defined in the opening part of claim 9.

2. Background Art

Such a data carrier for contact-bound communication via a communication contact, as defined in the opening part of claim 9 is known from the document WO96/38814 and takes the form of a transponder of a smart card. The known data carrier is adapted to transfer communication data from or to a write/read station via a contact pad of the smart card. The contact pad of the smart card has six contact faces, two power supply contact faces serving to power the data carrier with an external supply voltage, a reset contact face serving to receive reset information, and a clock contact face serving to receive a clock signal. Two further contact faces are communication contact faces, which are each connected to a communication contact of the data carrier and via which the communication data are transferred to the write/read station. Thus, communication data are received via the first communication contact of the data carrier and communication data are supplied via the second communication contact.

The known data carrier includes power supply means to which the external supply voltage can be applied by the write/read station and by which an internal supply voltage can be supplied for the power supply of the electrically active module of the data carrier. Such power supply means are also known from data carriers for the contactless communication via an antenna stage, where an HF signal can be applied to the power supply means by the antenna stage and an internal supply voltage can be supplied for the power supply of the electrically active module of the data carrier. These power supply means have the property that it is not possible to determine the instantaneous power consumption of the data carrier by analysis of the power (HE signal, external supply voltage) applied to the power supply means.

It is very important that these modules of the data carriers are powered with the internal supply voltage (power) only via the power supply means. On the other hand, it would be possible, by applying an additional external supply voltage (analysis voltage) to one of the communication contacts, to impress an analysis current having a supply current strength and to power all the modules of the data carrier with this current. Moreover, it should be avoided that the modules are energized only partly with an analysis current having only a supply current strength, because in such a case a hacker could also detect secret data processed by the data carrier by analyzing the variation of the power consumption in the data carrier as a function of time, which power consumption depends on the mode of operation of the data carrier.

The known data carrier includes processing means (microprocessor) for processing received or stored communication data. The known data carrier further includes an output stage, which is connected to the processing means and the second communication contact, to supply communication data processed by the processing means to the write/read station.

Such an output stage usually includes a control stage, a first transistor (P-channel field-effect transistor) and a second transistor (N-channel field-effect transistor). Both transistors have drain terminals (first output terminal, second input terminal) connected to the communication contact. The first transistor has a source terminal (first input terminal) connected to the internal supply voltage and the second transistor has a source terminal (second output terminal) connected to a reference potential of the power supply means.

The control stage is connected to gate terminals (control terminals) of the two transistors and alternately drives the transistors into conduction, in accordance with the communication data to be supplied. As a result of this, the communication contact is connected either to the internal supply voltage or to the reference potential, in order to supply a high level or a low level to the write/read station as communication data.

It has proved to be a drawback of the output stage of the known data carrier that the first transistor (P-channel field-effect transistor) has a parasitic diode which is poled in the forward direction from the drain terminal to the bulk terminal, which is connected to the source terminal, and which under certain conditions makes enables an analysis current having at least an analysis current strength to be fed in and enables the aforementioned hacking of secret data by a hacker. Moreover, under certain conditions during the supply of a high level of the communication data, i.e. when the first transistor is in its conductive state, an analysis current can be fed in and secret data can be detected by a hacker.

It has proved to be a further drawback of the control stage of the known data carrier that the external supply voltage (analysis voltage) applied to the communication contact may lead to an undesired increase of the internal supply voltage, as a result of which individual modules of the data carrier may be destroyed.

SUMMARY OF THE INVENTION

It is an object of the invention to provide an output stage for a data carrier, in which the feed-in of the analysis current having at least the analysis current strength is inhibited so as to guarantee the integrity of the secret data stored in the data carrier and processed by means of the data carrier and so as to prevent modules of the data carrier from being destroyed by an excessive internal supply voltage. This object is achieved by means of the measures defined in the characterizing part of claim 1 for a data carrier output stage as defined in the opening part of claim 1 and by the measures defined in the characterizing part of claim 9 for a data carrier as defined in claim 9.

Thus, it is achieved that even when an external supply voltage (analysis voltage) is applied to the communication contact of the data carrier no analysis current having the analysis current strength or even the supply current strength can be injected into the data carrier via the communication contact. This has the advantage that, on the one hand, a hacker cannot detect secret data stored or processed in the data carrier by injecting the analysis current via the communication contact and the advantage that, on the other hand, modules of the data carrier cannot be destroyed by an internal supply voltage increased by the analysis current.

The measures defined in claim 2 provide an output stage having inhibit means in accordance with the invention, which proves to be particularly advantageous in practice.

The measures defined in claim 4 have the advantage that an inhibit means can be realized in a particularly cheap manner as a linear resistor.

The measures defined in claim 5 have the advantage that as a result of the limitation of an external supply voltage (analysis voltage) applied to the communication contact the current strength of the analysis current impressed via the resistor and the parasitic diode of the first transistor is kept smaller than the analysis current strength.

The measures defined in claim 6 have the advantage that feeding in of the analysis current by applying the external supply voltage (analysis voltage) to the communication contact is completely inhibited.

The measures defined in claim 7 have the advantage that a Schottky diode has a particularly small voltage drop (threshold voltage approximately 0.3 V) in the forward direction. The provision of the Schottky diode has the advantage that it prevents an analysis current and reduces the voltage value representative of the high level of the communication data only to a small extent.

The measures defined in claim 8 have the advantage that when no communication data are supplied from the output stage to the communication contact the first transistor is cut off and the internal supply voltage is not applied to the communication contact as a high level. Consequently, slight variations of the internal supply voltage cannot be analyzed by a hacker in order to detect secret communication data.

The measures defined in claim 10 have the advantage that the N-channel field-effect transistor in the output stage does not have a parasitic diode poled in the forward direction from the drain terminal to the source terminal (bulk terminal), which would enable the injection of an analysis current.

The measures defined in claim 11 have the advantage the inhibit means are formed by the first transistor and the control stage themselves, the first transistor being turned off and inhibiting the application of the analysis current when an analysis voltage in excess of the internal supply voltage is applied to the communication contact.

The measures defined in claim 12 have the advantage that the data carrier with the output stage can be manufactured particularly cheaply.

DETAILED DESCRIPTION OF THE INVENTION

The invention will now be described in more detail with reference to the Figures, which show three embodiments which are given by way of example but to which the invention is not limited.

Figure 1:
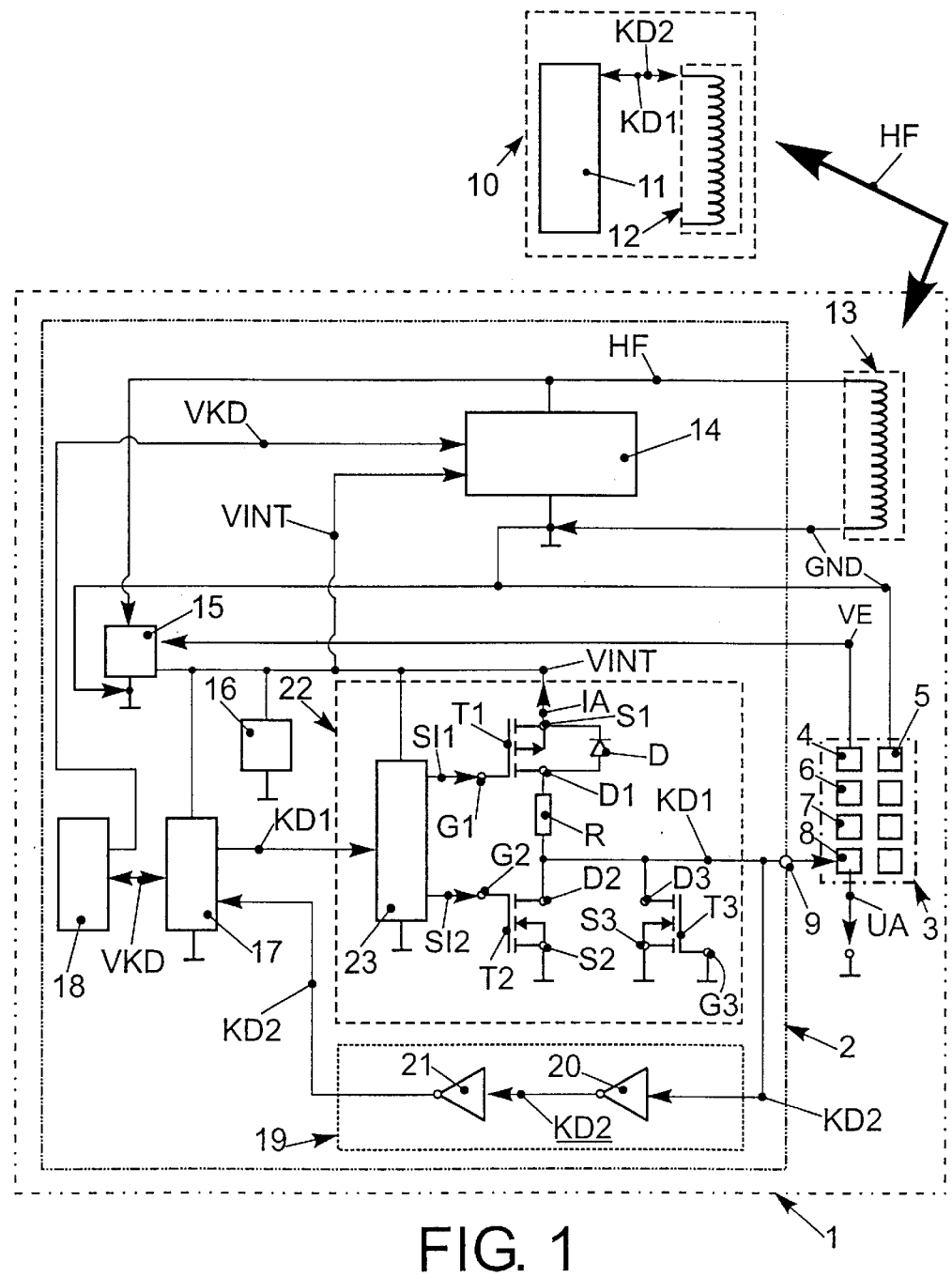
FIG. 1 is a block diagram of a data carrier which includes an output stage having a linear resistor as inhibit means for inhibiting an analysis current having an analysis current strength.

FIG. 1 shows a smart card 1 which includes a data carrier 2 and a contact pad 3. In a contact-bound mode the mart card 1 can be used as a bank card, which can be inserted into an automated teller machine in order to debit an amount of money from the account of the card owner and to store this amount of money in the data carrier 2 in the form of communication data. The automated teller machine then forms a write/read station for the contact-bound communication with the data carrier 2.

The contact pad 3 of the smart card 1 has eight contact faces for contact-bound communication. An external supply voltage VE can be applied to a first power supply contact face 4 and a reference potential GND can be applied to a second power supply contact face 5 by the write/read station. The data carrier 2 can be powered by the external supply voltage VE. The contact pad 3 further has a reset contact face 6 for receiving reset information and a clock contact face 7 for receiving an external clock signal.

The contact pad 3 further has a communication contact face 8, which is connected to a communication contact 9 of the data carrier 2. The data carrier 2 is adapted to provide contact-bound communication with the write/read station via the communication contact 9 and the communication contact face 8, the data carrier 2 supplying first communication data KD1 to the write/read station and receiving second communication data KD2 from the write/read station.

It is to be noted that for the simplicity of the drawings the data carrier 2 is shown to have only the communication contact 9. It is obvious that a data carrier in accordance with the invention may have several of such communication contacts 9 in order to communicate with the write/read station or also with a data processing device that may be included the smart card 1. Such a data processing device may be, for example, a display chip for driving a display of the smart card. For the simplicity of the description of the data carrier 2 the commonly known processing of the signals received at the reset contact face 6 and the clock contact face 7 is neither described in further detail.

In a contactless mode the smart card 1 is adapted to provide contactless communication with a transmitting/receiving station 10. The transmitting/receiving station 10 includes processing means 11 and an antenna stage 12. The antenna stage 12 can supply an HF signal HF, which may contain first communication data KD1 or second communication data KD2. For the contactless communication the smart card 1 includes an antenna stage 13 and for processing the first communication device KD 1 to be transmitted and for processing the received second communication data KD2 the data carrier 2 includes processing means 14 whose operation is commonly known.

In its contactless mode the smart card 1 can be used as an electronic ticket. In the present case, the transmitting/receiving station 10 is integrated in a subway ticket machine and, when a person holds the smart card 1 in the proximity of the ticket machine, it is adapted to debit the fare from the amount of money stored in the data carrier 2.

The data carrier 2 has power supply means 15 which are connected to the first power supply contact face 4 and the second power supply contact face 5 and to which, in the contact-bound mode, the external supply voltage VE and the reference potential GND can be applied by the write/read station. In FIG. 1 the reference potential GND of the internal supply voltage VINT is represented as a ground symbol and is connected to the electrically active means of the data carrier 2.

In the contactless mode the HF signal HF received by the antenna stage 13 can be applied to the power supply means 15. In the contact-bound mode and in the contactless mode the power supply means 15 are adapted to generate an internal supply voltage VINT and to apply the internal supply voltage VINT to all the electrically active means (power consuming elements) of the data carrier 2. Owing to the provision of buffer capacitances the power supply means 15 have the feature that the instantaneous power consumption of the data carrier 2 cannot be determined by analyzing the power (HF signal HF, external supply voltage VE) applied to the power supply means 15.

The data carrier 2 further includes voltage limiting means 16 adapted to limit the internal supply voltage VINT to a maximum internal supply voltage VINT. This prevents parts of the data carrier 2 from being damaged as a result of an excessive supply voltage VE or an HF signal HF having very high amplitudes. However, it is to be noted that in the case of a considerably higher external supply voltage VE or in the case of an HF signal HF having very high amplitudes the voltage limiting means 16 can no longer drain the applied energy, which may lead to damaging of parts of the data carrier 2 in that case.

The data carrier 2 further includes processing means 17 for processing the communication data KD2 received from the write/read station in the contact-bound mode and for supplying the first communication data KD1 to be applied to the write/read station. In the present case, the processing means 17 are formed by a microprocessor 80C51 and a ROM memory for the storage of the processing program.

The data carrier 2 further includes memory means 18 adapted to store communication data VKD processed by the processing means 14 in the contactless mode or processed by the processing means 17 in the contact-bound mode. In addition, communication data VKD, which may represent for example an authorization code for the teller machine or other secret information, may have been stored already in the memory means 18 during the manufacture of the data carrier 2.

In this respect it is to be noted that there is a risk that hackers (non-authorized persons) may develop an analysis method by means of which the possibly secret communication data VKD stored in memory means of a data carrier and processed by processing means of the data carrier could be detected. With such an analysis method an analysis voltage UA could be applied to the communication contact of the data carrier to energize the electrically active means of the data carrier directly with the analysis voltage instead of via the internal power supply means. By analyzing the power consumption of the data carrier, for example during a read cycle for the read-out of secret communication data VKD stored in the memory means, the secret communication data VKD could be determined, which is highly undesirable.

The data carrier 2 further has an input stage 19 connected to the communication contact 9 and to the processing means 17. The input stage 19 includes a first inverter 20 and a second inverter 21. The inverter 20 has a very high input resistance, which is why an output stage of the write/read station should not have a high output power. The second inverter 21 is arranged after the first inverter 20 in order to supply the second communication data KD2 inverted by the first inverter 20 to the processing means 17 as non-inverted second communication data KD2.

The data carrier 2 now includes an output stage 22 which amplifies the electric signal which conveys the second communication data KD2 to be supplied to the write/read station by the processing means 17 in the contact-bound mode. The output stage 22 has a first transistor T1, a second transistor T2 and a control stage 23. The transistors T1 and T2 are so-called field-effect transistors, the first transistor T1 being formed by a so-called P-channel field-effect transistor and the second transistor T2 being formed by a so-called N-channel field-effect transistor.

The first transistor T1 has its source terminal S1 connected to the internal supply voltage VINT and has its gate terminal (G1) connected to the control stage 23. The second transistor T2 has its drain terminal D2 connected to the communication contact 9, its gate terminal G2 to the control stage 23 and its source terminal S2 to the reference potential GND.

The control stage 23 is adapted to supply first control information SI1 to the gate terminal (G1) of the first transistor T1 in order to drive the first transistor T1 into its conductive state. The control stage 23 is further adapted to supply second control information S12 to the gate terminal G2 of the second transistor T2 in order to drive the second transistor T2 into its conductive state. The control stage 23 then applies the first control information SI1 to the first transistor T1 in order to supply a high level (VINT) of the first communication data KD1 and applies the second control information S12 to the second transistor T2 in order to supply a low level (GND) of the first communication data KD1.

It is to be noted that field-effect transistors have so-called parasitic diodes and that P-channel field-effect transistors, such as the first transistor T1, have a parasitic diode D, which is poled in the forward direction from the drain terminal D1 to a bulk terminal connected to the source terminal S1. This parasitic diode D of the first transistor T1 causes a so-called parasitic current or an analysis current IA to be impressed via the parasitic diode D when the potential on the drain terminal D1 is higher than that on the source terminal S1.

By applying an analysis voltage UA to the communication contact face of the known data carrier an analysis current IA having a supply current strength for the power supply of the electrically active means of the data carrier was injected by the aforementioned hacker and was used to detect secret communication data VKD.

In the contactless mode, in which the active means of the data carrier are energized with the internal supply voltage VINT by the power supply means with the aid of the HF signal HF, a hacker could likewise apply the analysis voltage UA to the communication contact face of the data carrier and evaluate the analysis current IA, which is dependent on small fluctuations of the internal supply voltage VINT and which has only a very small analysis current strength, in order to detect secrete communication data VKD.

In addition, when it has a comparatively large current strength, this analysis current IA could cause a comparatively high internal supply voltage VINT to be supplied by the power supply means 15, as a result of which first of all the voltage limiting means 16 and subsequently the processing means 14, the processing means 17 and the control stage 23 would be destroyed.

The output stage 22 now has inhibit means which are adapted to inhibit the analysis current IA having the analysis current strength or a larger current strength being fed in from the communication contact 9 to the further means of the data carrier 2 via the first transistor T1. In the embodiment shown in FIG. 1 the inhibit means are formed by a linear resistor R connected to the drain terminal D1 of the first transistor T1 and the drain terminal D2 of the second transistor T2.

Thus, it is achieved that when a hacker applies the analysis voltage UA to the communication contact 9 via the communication contact face 8 and the reference potential GND to the second power supply contact face 5 and the potential D1 on the drain terminal D1 is consequently higher than that on the source terminal S1 the analysis current IA thus impressed produces a voltage drop across the resistor R, which reduces the current strength of the analysis current IA to a current strength which is substantially smaller than the analysis current strength IA.

This has the advantage that it is thus avoided that the analysis current IA impressed via the communication contact 9 can be used for energizing the processing means 14, the processing means 17 and the control stage 23 or rather for analyzing the processing modes of the data carrier 2. Consequently, it is not possible to unravel secret communication data VKD stored in the memory means 18. Another advantage is that it is avoided that parts of the data carrier 2 are destroyed by an excessive internal supply voltage VINT, which could be caused by an analysis current IA having a high current strength.

The output stage 22 now further includes a voltage limiting stage, which is formed by a third transistor T3. The third transistor T3 has its drain terminal D3 connected to the drain terminal D2 of the second transistor T2 and has its source terminal S3 and its gate terminal G3 connected to the reference potential GND. The third transistor T3 is adapted to limit the analysis voltage UA applied to threshold communication contact 9.

This has the advantage that the analysis voltage UA, which is limited by the voltage limiting stage, impresses only an analysis current IA having a very small current strength, which is substantially smaller than the analysis current strength IA.

The control stage 23 is further adapted to drive the first transistor T1 into its cut-off state (no first control information SI1) and to drive the second transistor T2 into its conductive state (second control information SI2) when no first communication data KD1 are applied to the communication contact 9 via the output stage 22.

This has the advantage that the internal supply voltage VINT can only be determined by a hacker when during communication the high level is applied to the communication contact face 8. This is not possible at any other time, which is why it is virtually impossible for a hacker to determine small voltage fluctuations of the internal supply voltage VINT in order to detect secret communication data VKD by measuring the voltage on the communication contact face 8.

It is to be noted that the data carrier 2 is formed by an integrated circuit and can thus be fabricated at particularly low cost.

Figure 2:
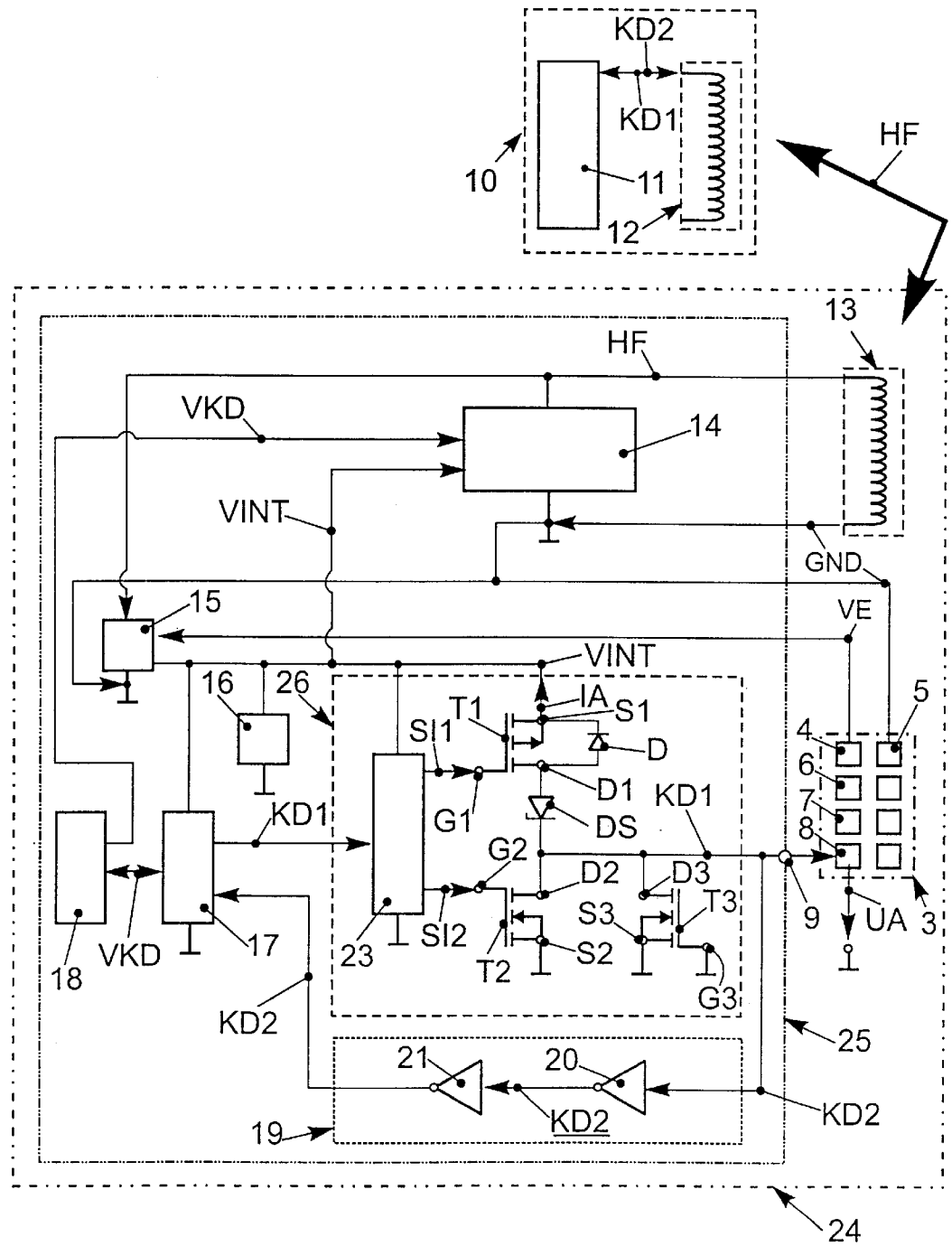
FIG. 2 is a block diagram of a data carrier which includes an output stage having a diode as inhibit means for inhibiting an analysis current.

FIG. 2 shows a smart card 24 which includes a data carrier 25 having an output stage 26. The data carrier 25 corresponds to the data carrier 2 shown in FIG. 1, the inhibit means for inhibiting the feed-in of the analysis current IA having at least the analysis current strength being formed by a diode DS in the data carrier 25. The diode DS in the form of a Schottky diode is poled in the reverse direction from the communication contact 9 to the drain terminal D1 of the first transistor T1.

Providing the diode DS has the advantage that when a hacker applies the analysis voltage UA to the communication contact 9 via the communication contact face 8 and the potential on the communication contact 9 becomes consequently higher than that on the drain terminal D1, that feeding-in of the analysis current IA is completely inhibited by the diode DS. This precludes both the hacking of stored secret communication data VKD and a destruction of parts of the data carrier 25 by an analysis voltage UA applied to the communication contact 9.

Figure 3:
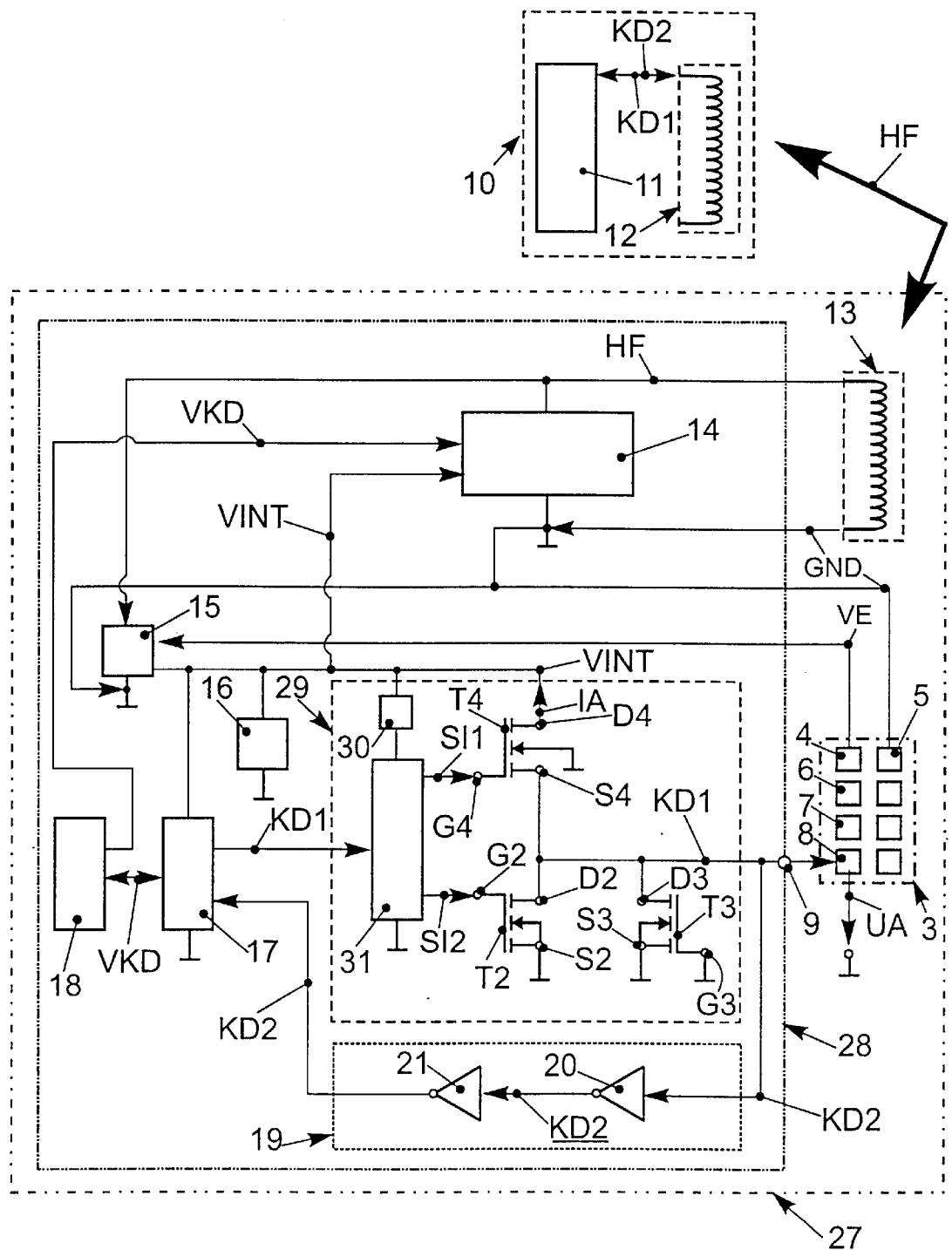
FIG. 3 is a block diagram of a data carrier in which a transistor of the output stage forms inhibit means.

FIG. 3 shows a smart card 27 which includes a data carrier 28 having an output stage 29. The data carrier 28 corresponds to the data carrier 2 shown in FIG. 1, the inhibit means for inhibiting the feed-in of the analysis current IA having at least the analysis current strength in the data carrier 28 being formed by a fourth transistor T4, which forms the first transistor T1, a voltage raising stage 30 and a control stage 31. The first input terminal being formed by the drain terminal D4 and the first output terminal being formed by the source terminal S4 of the fourth transistor T4. The fourth transistor T4, like the second transistor T2, is an N-channel field-effect transistor which neither has a parasitic diode between its source terminal S4 and the internal supply voltage VINT nor between its drain terminal D4 and the internal supply voltage VINT.

The voltage raising stage 30 is adapted to raise the internal supply voltage VINT by a factor of 1.5× and includes several capacitors and transistors, as is commonly known. The higher internal supply voltage VINT generated by the voltage raising stage 30 can be supplied to the control stage 31.

The control stage 31 corresponds to the control stage 23 of the data carrier 2, the control stage 31 being adapted to supply a switching voltage value as first control information SI1, which value is equal to the internal supply voltage VINT, which is applied to the drain terminal D4 of the transistor T4, increased by the threshold voltage of the fourth transistor T4. The threshold voltage of field-effect transistors is typically 0.6 V and corresponds to the voltage drop between the gate terminal G4 and the source terminal S4 of the fourth transistor T4 in its conductive state.

If the hacker now applies to the communication contact 9 the analysis voltage UA having a voltage value higher than the internal supply voltage VINT the fourth transistor T4 is cut off, also when the first control information SI1 is present, which completely prevents the feed-in of the analysis current IA.

Providing the inhibit means described hereinbefore has the advantage that when a hacker applies the analysis voltage UA to the communication contact 9, the feed-in of the analysis current IA is prevented both as a result of the absence of the parasitic diode between the drain terminal D4 or the source terminal S4 and the internal supply voltage VINT and as a result of the automatic cut-off of the fourth transistor T as described hereinbefore. This precludes both hacking of stored secret communication data VKD and a destruction of parts of the data carrier 28 by the analysis voltage UA on the communication contact 9.

It is to be noted that a voltage corresponding to the analysis voltage also appears on the communication contact during normal operation of the data carrier, when the write/read station supplies second communication data KD2 to the communication contact. The aforementioned inhibit means are also advantageous in this situation because in this case they provide protection against an excessive internal supply voltage and protection against hacking of secret communication data.

What is claimed is:

1. An output stage of a data carrier, which output stage is connected to a communication contact, said data carrier providing contact-bound communication via the communication contact, including an electrical component which can be brought into an operational state in which a parasitic diode of the electrical component feeds an analysis current into the data carrier, characterized in that inhibit means are included, which inhibit means prevent the internal supply voltage from being determined in that an analysis current having an analysis current strength is fed from the communication contact into the data carrier via the parasitic diode of the electrical component, the analysis current having the analysis current strength which is suited for the analysis of a power consumption of the data carrier and for hacking communication data processed in the data carrier.

2. An output stage as claimed in claim 1, in which the electrical component is formed by a transistor having a first control terminal, a first input terminal and a first output terminal, and in which the output stage includes the following further components:

a second transistor having a second control terminal, a second input terminal and a second output terminal, and a control stage for supplying first control information to the first control terminal, in order to drive the first transistor into its conductive state, and for supplying second control information to the second control terminal, in order to drive the second transistor into its conductive state, in which an internal supply voltage generated by power supply means of the data carrier is supplied to the first input terminal and a reference potential is supplied to the second output terminal and in which the second input terminal is connected to the communication contact of the data carrier.

3. An output stage as claimed in claim 2, characterized in that the inhibit means are connected to the first output terminal and the second input terminal.

4. An output stage as claimed in claim 3, characterized in that the inhibit means are formed by a linear resistor of at least 100 Ω.

5. An output stage as claimed in claim 4, characterized in that a voltage limiting stage is included, which stage is connected to the second input terminal to limit an analysis voltage applied to the communication contact.

6. An output stage as claimed in claim 2, characterized in that the inhibit means are formed by a diode poled in the reverse direction from the communication contact to the first output terminal.

7. An output stage as claimed in claim 6, characterized in that the diode is a Schottky diode.

8. An output stage as claimed in claim 2, characterized in that the inhibit means are formed by the control stage which, when no communication via the communication contact is in progress, drives the first transistor into its cut-off state and drives the second transistor into its conductive state.

9. A data carrier for contactless communication via an antenna stage and for contact-bound communication via a communication contact, including processing means for the processing of communicated communication data, and including memory means for the storage of processed communication data, and including power supply means to which an antenna signal is applied by the antenna stage and which supplies an internal supply voltage relative to a reference potential, characterized in that an output stage as claimed in claim 1 is included, by means of which the communication data is supplied from the processing means to the communication contact via the output stage.

10. A data carrier as claimed in claim 9, characterized in that the first transistor and the second transistor are N-channel field-effect transistors.

11. A data carrier as claimed in claim 10, characterized in that the control stage supplies a switching voltage value as first control information, which switching voltage value is equal to the internal supply voltage increased by approximately the threshold voltage of the first transistor.

12. A data carrier as claimed in claim 9, characterized in that the data carrier takes the form of an integrated circuit.

* * * * *